Inventor
Robert Bourggraff
Georg Hainke

By Bauer and Seymour
Attorney

United States Patent Office 3,457,058
Patented July 22, 1969

3,457,058
APPARATUS FOR MANUFACTURE OF FLAT WIRE GLASS
Robert Bourggraff and Georg Hainke, Stolberg, Germany, assignors to Compagnie de Saint-Gobain, Neuilly-sur-Seine, France
Continuation of application Ser. No. 396,666, Sept. 15, 1964. This application Jan. 4, 1968, Ser. No. 695,807
Claims priority, application France, Sept. 17, 1963, 947,733
Int. Cl. C03c 27/08; C03b 13/12
U.S. Cl. 65—148                3 Claims

ABSTRACT OF THE DISCLOSURE

Apparatus and method for continuously forming sheet glass in ribbon form, in particular reinforced sheet glass. The molten glass is formed into an incipient ribbon by and between a lower roller and the lip of an upper transom over and spaced from the contiguous element of the roller. It is then immediately smoothed by and between the aforesaid lower roller and a second or upper roller spaced therefrom and downstream of the transom. Where reinforcement is to be introduced it is drawn downwardly between the transom and the upper roller, and passes about and in contact with a guide bar located between the transom and second roller, and closely adjacent the second roller. This guide bar determines the depth of penetration of the reinforcement into the glass. The transom may be made in separate discrete sections aligned transversely across the ribbon throughout the width thereof. Each section may be individually adjusted vertically and horizontally to assure uniform thickness of the ribbon transversely thereacross. Means are provided to heat the transom, whether in one piece or in sections. The lower surface of the ribbon is cooled by the lower roller to impart a degree of rigidity thereto. The upper surface however, remains substantially at the temperature of the melting tank, until the reinforcement has been introduced. The lower roller effects the dual functions of assisting in formation of the ribbon and in smoothing it to final form in cooperation with the upper roller. The upper roller may be replaced without interrupting continuity of production.

---

Figure 1:
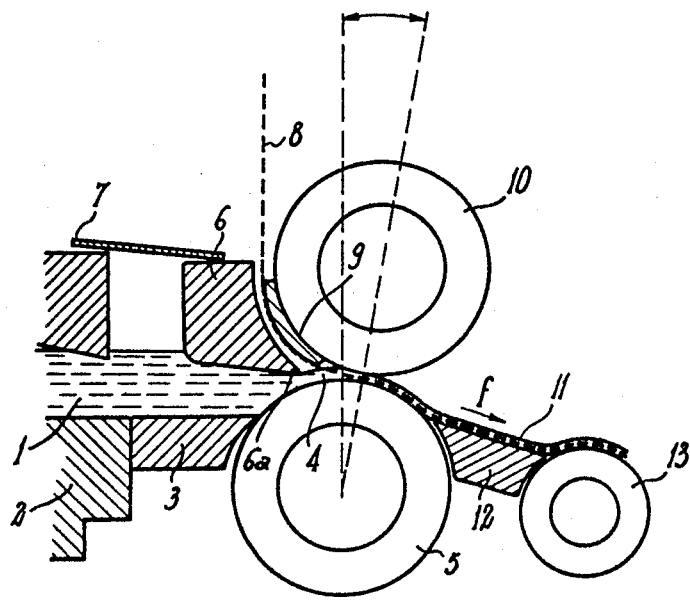

This application is a continuation of our prior copending application Ser. No. 396,666, filed Sept. 15, 1964, now abandoned.

This invention relates to a method of and apparatus for the production of sheet glass in ribbon-like form, both with and without metallic armor or reinforcement.

More particularly the invention relates to a method of and apparatus for the production of armored or reinforced sheet glass constituting an improvement over the disclosure of French Patent 1,276,154, wherein the reinforcement is pressed into one surface of the incipient sheet, while the material is molten or plastic and the impressions left by the insertion of the reinforcement are smoothed over by pressure upon the ribbon. It is the chief object of the invention to provide a simplified but highly practical and useful method of and apparatus for the production of sheet glass in ribbon-like form, efficiently, with a high degree of precision of the finished product. Another object is to provide an apparatus as aforesaid wherein the travel of the glass between the time it leaves first means forming an incipient ribbon until it is completely formed by second forming means, is maintained at a minimum, and which thus affords precise control of temperature and a superior final product.

A further object is to provide an apparatus wherein armor or reinforcement is introduced into an incipient or preformed ribbon of molten glass and wherein, due to the arrangement and disposition of parts, the heat loss at the supper surface of the preformed ribbon, due to the contact with the preforming means, is kept at a minimum.

Yet another object of the invention is to provide an apparatus of the type aforesaid wherein but two rollers are used for the formation of the glass and the lower of the two rollers performs the dual function of assisting in the formation of the ribbon and sequentially, in the smoothing of the surface of the glass.

Ancillary to the immediately foregoing object, it is a further object to provide an apparatus which is particularly useful for the production of reinforced or armored glass, in that the second roller acts without delay to smooth and eradicate impressions or indentations otherwise formed by the immersion of the reinforcement into the surface of the molten glass. Other objects and advantages will become apparent to those skilled in the art, after a study of the following detailed description.

The invention disclosed in the aforesaid French patent comprises two pairs of rollers. The first pair acts to form the ribbon of glass as it is drawn from the melting tank or furnace, while the second pair of rollers exert the pressure necessary to close and smooth over the impressions left in one face of the ribbon after the reinforcement has been inserted thereinto.

According to the present invention there are provided a lower pressure roller, a transverse dam, barrier or transom immersed in the glass as it is drawn from the melting tank and which, in conjunction with the aforesaid lower roller defines a flat transverse opening through which the molten glass is drawn. Also provided is a device to guide the reinforcement into position and to insert it into the incipient ribbon of glass after it has just emerged from the aforesaid opening and while passing over and about an upper portion of the circumference of the roller and which we define as a "zone of introduction." A second or upper roller cooperates with the aforesaid lower roller at a position downstream from the zone of introduction, to exert pressure upon the ribbon and thereby smooth the impressions left by insertion of the metallic reinforcement.

Figure 2:
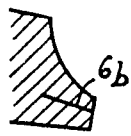
Figure 3:
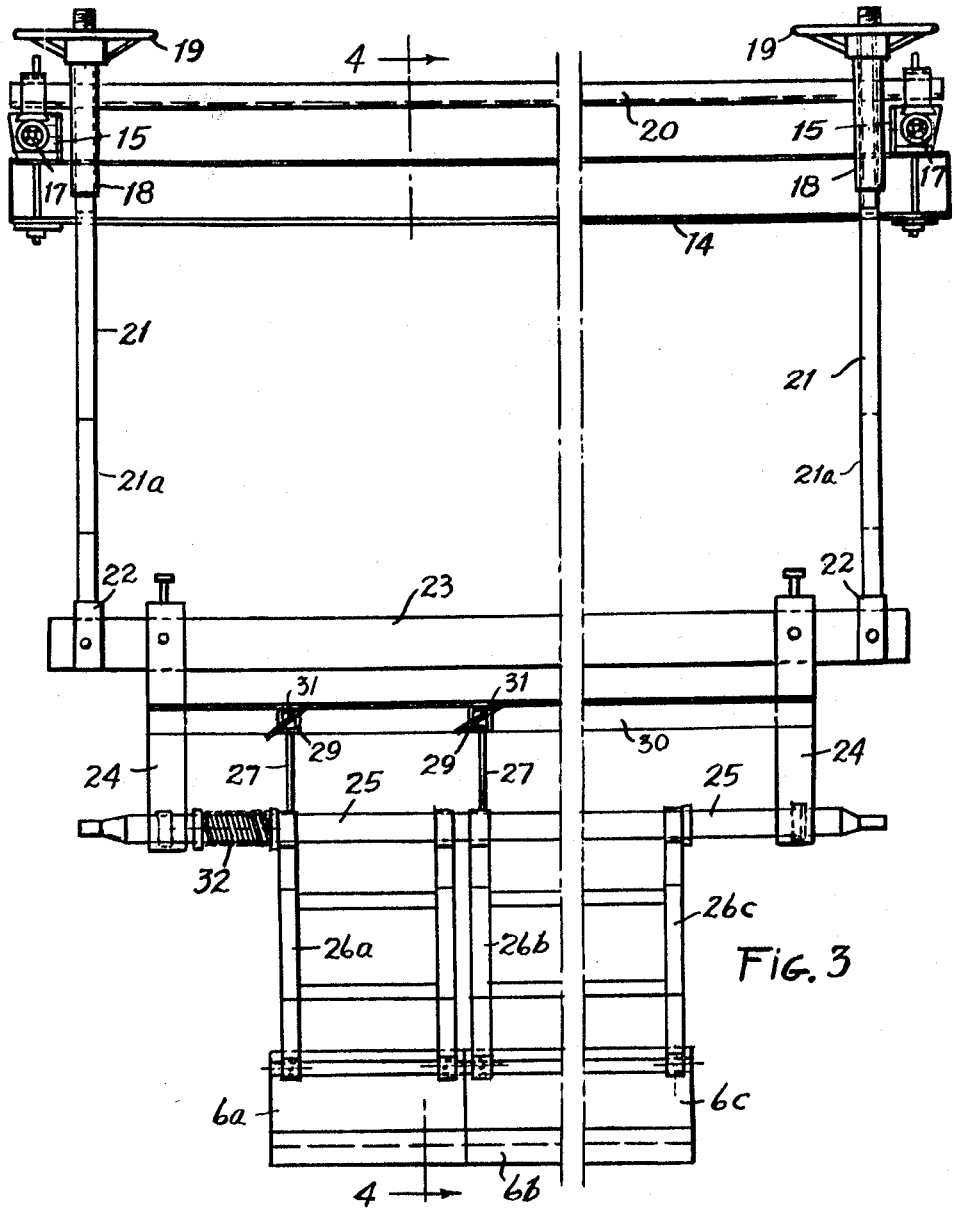
Figure 4:
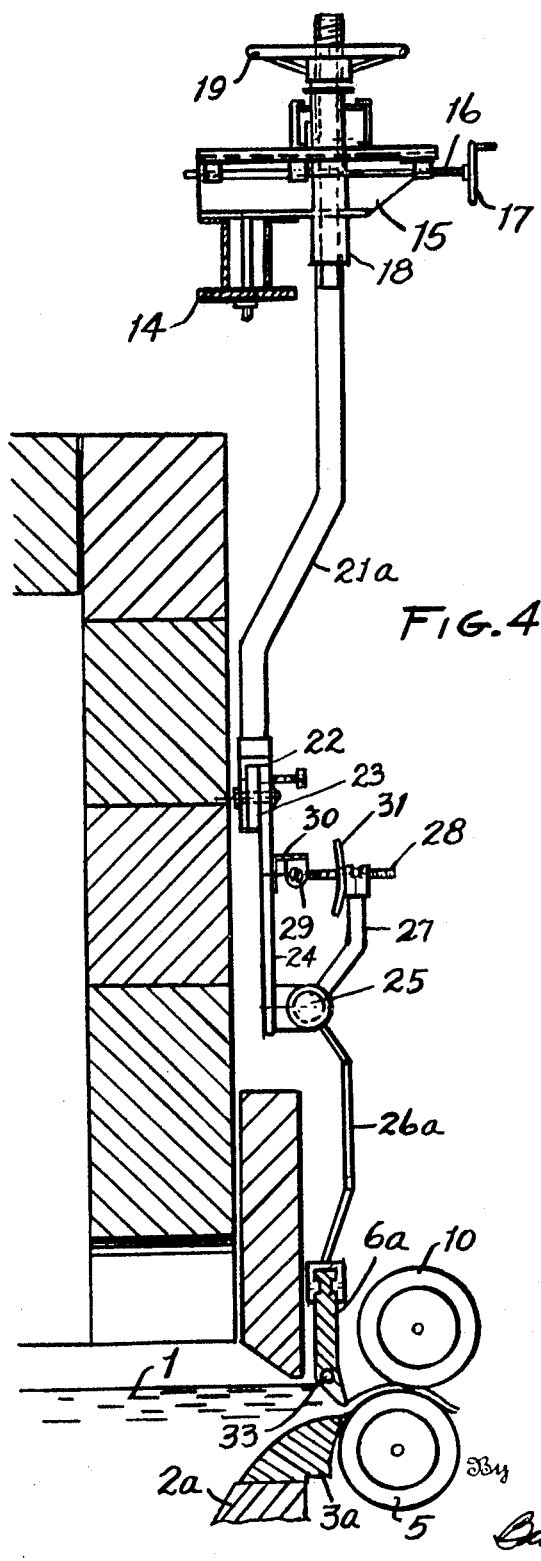

In the drawing:
FIGURE 1 is a vertical elevation, partly in section, of one form of the invention;
FIGURE 2 is a detail of a modified form of transom;
FIGURE 3 is a front elevation of a form wherein the glass barrier or transom is made in sections, with each section being adjustable; and
FIGURE 4 is a section taken in a plane identified by line 4—4, FIGURE 3.

Referring in detail to FIGURE 1, 1 identifies a mass of molten glass adjacent and about to emerge from the outlet in the wall of tank or furnace 2. The glass flows from the outlet to and over a ledge or pad 3, into immediate contact with the upper surface of lower roller 5. It will be noted that this roller is so positioned that its uppermost element parallel with its axis of rotation, and which we term the "crest" thereof, is at a higher elevation than the upper surface of pad or ledge 3.

The temperature of the emerging glass is of the order of 1150° to 1200° C.

A transom 6 of refractory material is located above and upstream from roller 5. This transom is so positioned that the molten glass is shaped into the form of an incipient ribbon by passage through the space or opening conjointly defined by the lip 61 of the transom and the contiguous surface of roller 5. The opening between the top of furnace 2 and transom 6 is closed by a cover 7 to prevent or reduce loss of heat.

A continuous web of metallic reinforcement 8 such as wire mesh, is guided vertically downwardly by a roller not shown, and passes about and beneath a guide bar 9 having a transverse curvature to fit closely about a portion of the surface of upper roller 10. As shown, the lower edge of bar 9 lies closely adjacent the upwardly and forwardly curved surface of the incipient ribbon of glass and thus acts to guide the reinforcement into the glass in parallel relation with the upper and lower surfaces thereof. The pull exerted by the glass ribbon in the direction of the arrow $f$ acts to cause the reinforcement to penetrate into the glass within the aforesaid zone of introduction, that is, at or along a line just in advance of the minimum separation between the rollers. The curve or arc formed by the glass ribbon as it passes upwardly over the crest of roller 5 assists in embedding the metallic reinforcement within and between the surfaces of the glass.

Upper roller 10 has been previously mentioned. This roller is so positioned that the plane determined by its axis of rotation and the corresponding parallel axis of roller 5, is slightly inclined forwardly and upwardly. It is contemplated that this angle may be varied or adjusted. The upper roller is so located that in cooperation with the contiguous surface of roller 5, it acts to obturate and smooth out the impressions formed by the insertion of the reinforcement into the glass.

The position of the lower edge of guide 9 relatively to the adjacent surface of roller 5, determines the depth of penetration of the reinforcement into the glass. The plane of the reinforcement is, in fact, determined by the elevation of guide 9 and it is important that in its path over the periphery of lower roller 5, the ribbon of glass intersects this plane in such a way that the reinforcement is embedded to the desired depth within the mass of glass.

After passing over table 12 the ribbon with its reinforcement properly embedded therein, passes to and over a roller 13 for cooling and subsequent processing in accordance with known procedures.

In prior art devices and procedures the preforming of the sheet or ribbon of molten glass resulted in an excessive cooling of the surface of the glass due to the contact with the relatively cool preforming means. This cooling caused a set or at least an increase of the viscosity of the upper surface of the ribbon and produced undulations and optical inhomogeneities in the ribbon. The present invention enables obviation of this drawback because transom 6, being partly immersed in the molten glass emerging from the tank, has about the same temperature as the glass itself and thus assists in maintaining the upper surface of the glass at a high temperature until the reinforcement is properly positioned within the ribbon. Furthermore, transom 6 may be made hollow or provided with passageways through which hot gas or other fluid may be circulated to maintain the temperature thereof at an elevation which assists in maintaining the proper fluidity of the upper surface of the glass as it passes through the zone of introduction. Thus the invention enables a particularly advantageous uniform distribution of heat throughout the thickness of the glass ribbon.

Contact of the glass with the lower roller 5 effects a cooling of the lower surface of the sheet greater than that of the upper surface. This cooling effect imparts to the lower surface of the ribbon a rigidity sufficient to enable it to be properly advanced through the apparatus. The upper surface of the glass, for reasons just explained due to transom 6, has little or no cooling so that the formation of a congealment or "skin" on this surface is avoided or maintained at or below an acceptable limit.

The temperature of the glass following introduction thereinto of the reinforcement, should be low enough to prevent the formation of gas bubbles but still high enough to enable smoothing of the irregularities or identations otherwise left by the entry of the reinforcement into the glass. This temperature should be of the order of 1000° C.

Since the thickness of the emerging ribbon is determined by the position of the lip of transom 6 relatively to lower roller 5, the transom may be made adjustable vertically and also in the direction of travel of the emerging ribbon. Also, in the case of ribbons of, say, 1.5 m. or more in width, it is an advantage to make the transom in sections with each section individually adjustable, to compensate for and obviate variations in thickness of the ribbon transversely thereof, otherwise caused by heat distortion of a one-piece, unitary transom.

Such a construction is shown upon FIGURES 3 and 4 where, as in FIGURE 1, 1 identifies a mass of molten glass in melting tank 2a, with ledge 3a defining the lower edge of an exit opening for the glass. Lower and upper rollers 5, 10 may be the same and similarly disposed, as in FIGURE 1.

Transom 6, shown in FIGURE 1 as a one-piece unitary part is, in the species of FIGURES 3 and 4, made in sections 6a, 6b, 6c, etc., mounted in end-to-end relation to extend horizontally along the opening in the tank and to conjointly define a lip or edge forming the upper surface of the ribbon. All sections may be alike and similarly mounted. However, it is contemplated that the sections may be of varying dimensions in the direction normal to the plane of FIGURE 4.

A fixed beam 14 extends horizontally across the furnace at the top thereof and supports a number of short horizontal fore-and-aft bars 15 in spaced relation therealong. Each bar journals a horizontal fore-and-aft screw 16 with handwheel 17. A nut is slidably mounted on and along each bar to support a respective one of an equal number of brackets 18 and rotatable handwheels 19. Screws 16 may be interconnected for operation in unison from any one of handwheels 17, by means of a splined shaft 20 and gearing, not shown, carried by the brackets so that, in an obvious way, all brackets are simultaneously adjustable forwardly and rearwardly by actuation of any handwheel.

Each bracket includes a splined sleeve in which fits a corresponding one of a number of generally vertical shafts 21 so that each shaft may be translated vertically in and with respect to its bracket but cannot rotate relatively thereto. Each shaft is threaded at its top end and is there engaged by the correspondingly threaded hub of its handwheel. Thus by actuation of these handwheels 19 the shafts may be given a fine vertical translation.

As seen upon FIGURE 4, shafts 21 are offset at 21a so that their lower ends are closely adjacent the furnace wall and glass discharge opening therein. Each shaft carries a clevis 22 at its lower end. These clevises jointly support a horizontal bar 23 at its ends. Bar. 23 in turn, has a plurality of straps 25 fixed thereto at their upper ends and depending in spaced relation therefrom. These straps conjointly mount a fixed horizontal shaft 25 on which a plurality of frames 26a, 26b, 26c, etc., are journaled for independent rotational adjustment.

Each frame 26a, etc., has an upwardly extending arm 27 fixed therewith. Each arm is slotted at its upper end to receive a pin fixed with a nut engaging a respective one of a number of generally horizontal threaded shafts 28, FIGURE 4. Each of these threaded shafts is swiveled at its rearward end in a corresponding bracket or support 29 carried by a bar 30. The ends of this bar are rigidly attached to straps 24. By actuation of a handwheel or knob 31 integral with its nut, each arm 27, together with its frame 26a, 26b, 26c, as the case may be, is given a fine rotational adjustment about the common axis defined by shaft 25.

Each frame has a respective one of transom sections 6a, 6b, etc., removably attached to its lower end, as clearly shown upon FIGURES 3 and 4.

Thus each transom section is made adjustable. By operating handwheels 17 the sections are translated in unison in the fore-and-aft direction, and by turning handwheels 19 they may be translated vertically. By these adjustments the thickness of the incipient ribbon may be varied with a high degree of accuracy. When any given knob or handwheel 31 is turned, the corresponding section such as 6a, for example, is pivoted about the axis of shaft 25 so that the lower lip thereof is moved in an arcuate path to individually vary the separation thereof from lower roller 5, which cooperates with the transom to form the incipient ribbon in the manner previously described. A coil spring 32 is positioned about one end of shaft 25 and abuts at one end against a collar fixed with the shaft and at its other end with frame 26a to thereby urge all frames to the right as seen upon FIGURE 3 and thereby avoid any substantial gaps between contiguous ends of the sections.

Thus variations in thickness of the ribbon transversely thereof, otherwise caused by heat distortion of a solid, one-piece transom, may be obviated by the individual adjustments of knobs 31; and the thickness of the ribbon is at the same time under precise control and variation when desired, through the simultaneous adjustment of all sections by turning of handwheels 17 and 19.

The diameter of lower roller 5 may be varied within greater limits than in those prior art installations where two flattening rollers are employed. The diametral dimension of this roller is therefore not highly critical in the present invention. Roller 10 may have its peripheral surface formed to impress any desired pattern into the surface of the ribbon as it passes therebeneath.

FIGURE 2 shows a particularly advantageous modification which may be incorporated into the apparatus both where the transom is in one unitary part as in FIGURE 1 as well as that wherein it is in sections as in FIGURES 3 and 4. In this modification the transverse edge of the transom, instead of having a relatively sharp edge as in FIGURE 1, for example, is blunt or broad and has a slot 36 along its length which can possibly receive an insert 37 of heat-insulating material.

The slot preferably extends uniformly throughout the length of the transom. This slot or the insert acts as a heat dam to reduce the flow of heat through the transom, from the molten glass to the cooler elements 8, 9 and 10. In this way the transom assists in maintaining the high temperature of the upper surface of the glass as it passes therebeneath. The transom itself may be of heat-resistant material such as ceramic or graphite so that it will be substantially unaffected by immersion in the bath of molten glass in the tank. An inert gas may be introduced into or caused to flow through the space between transom 6 and roller 10, to thus obviate in a known way, oxidation of the reinforcement when it arrives at the highly heated zone of introduction. At 33, FIGURE 4 is indicated generally a transverse bore in which may be positioned electrical heating units in each of the sections.

Another advantage of the invention is that the roller 10, since it does not participate in the actual formation of the glass ribbon, may be changed while the apparatus is in operation, without affecting the functions of the transom and lower roller. It is thus possible to change rollers 10, as from one pattern of impressions to another, without stopping the machine. Such changing of rollers is not possible in prior art devices without a complete shutdown of the device.

When the transom is made in sections as previously described, there is, of course, a slight spacing of about 1 mm. between contiguous sections. These spaces leave small longitudinally-extending ridges in the surface of the glass which are, however, immediately erased or smoothed as they pass beneath roller 10.

While the invention has been shown and described in connection with the formation and production of armored glass, it is clear that it is also very useful in the production of ordinary sheet glass, without reinforcement, because roller 5 still performs its dual function of forming and then smoothing the ribbon. Also the same precise temperature control that makes the invention so useful in the production of reinforced glass, is also of great advantage where ordinary or patterned glass without armor, is being produced.

There is thus provided an apparatus which is extremely versatile and which enables the efficient and accurate formation of sheet glass in ribbon-like form. It will be understood that, after passing from roller 13 the glass may be subjected to any known processing such as grinding and polishing.

Having fully disclosed the invention, what we claim and desire to secure by Letters Patent is:

1. In an apparatus for the fabrication by rolling, of sheet glass in ribbon form, comprising, superposed lower end upper roller means having horizontally offset axes of which that of the upper roller means is downstream of that of the lower roller means, means to flow molten glass horizontally from a glass furnace through a delivery slot comprising a lower ledge support and an upper adjustable transom means which dips into the molten glass and cooperates with said lower roller means and lower ledge support to form the molten glass into a ribbon of predetermined thickness, guide means to introduce wire mesh reinforcement downstream from said adjustable transom means, into the upper surface of the convex portion of said glass ribbon on the lower roller means, in advance of the upper roller means, said upper roller means cooperating with said lower roller means, to apply pressure to the glass ribbon downstream of the location at which the wire mesh reinforcement enters the glass, to close the cuts resulting from the introduction of the reinforcement into the ribbon.

2. The apparatus of claim 1, said transom means being divided longitudinally into a plurality of independently adjustable sections.

3. The apparatus of claim 1, said transom means including means for circulation of fluid in heat exchange relation therewith, for regulating the temperature thereof

References Cited

UNITED STATES PATENTS

| 1,541,638 | 6/1925 | Gelstharp | 65—148 |
| 1,824,366 | 9/1931 | Pond | 65—148 |
| 2,291,549 | 7/1942 | Gutmann | 65—148 |
| 1,904,118 | 4/1933 | Begemann | 65—149 |

S. LEON BASHORE, Primary Examiner

FRANK W. MIGA, Assistant Examiner

U.S. Cl. X.R.

65—94, 185, 324